(12) United States Patent  
Nomura et al.

(10) Patent No.: US 8,686,361 B2
(45) Date of Patent: Apr. 1, 2014

(54) RADIATION DETECTION APPARATUS AND METHOD FOR MANUFACTURING THE SAME

(75) Inventors: Keiichi Nomura, Honjo (JP); Satoshi Okada, Tokyo (JP); Kazumi Nagano, Fujisawa (JP); Yohei Ishida, Honjo (JP); Tomoaki Ichimura, Kitamoto (JP); Yoshito Sasaki, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/285,619

(22) Filed: Oct. 31, 2011

(65) Prior Publication Data

US 2012/0145905 A1 Jun. 14, 2012

(30) Foreign Application Priority Data

Dec. 13, 2010 (JP) ................................. 2010-277424

(51) Int. Cl.
*G01J 1/00* (2006.01)
(52) U.S. Cl.
USPC ....................................................... 250/336.1
(58) Field of Classification Search
USPC ....................................................... 250/336.1
See application file for complete search history.

(56) References Cited

U.S. PATENT DOCUMENTS

| 6,524,896 | B1 * | 2/2003 | Yamazaki et al. ............ 438/149 |
| 7,315,027 | B2 * | 1/2008 | Okada et al. ............ 250/370.11 |
| 2007/0051896 | A1 * | 3/2007 | Okada et al. ............ 250/370.11 |

FOREIGN PATENT DOCUMENTS

JP 2006-184187 A 7/2006

OTHER PUBLICATIONS

U.S. Appl. No. 13/349,041, filed Jan. 12, 2012.

* cited by examiner

*Primary Examiner* — David Porta
*Assistant Examiner* — Taeho Jo
(74) *Attorney, Agent, or Firm* — Fitzpatrick, Cella, Harper & Scinto

(57) ABSTRACT

A method for manufacturing a radiation detection apparatus is provided. The method comprising: forming a set of columnar crystals capable of converting radiation into visible light on a base; forming a supporting layer that supports the set of columnar crystals; separating the set of columnar crystals supported by the supporting layer from the base; preparing a sensor panel having a photoelectric conversion unit; and adhering a surface of the set of columnar crystals, that surface having been in contact with the base, to the sensor panel using an adhesive material, such that the set of columnar crystals covers the photoelectric conversion unit.

6 Claims, 3 Drawing Sheets

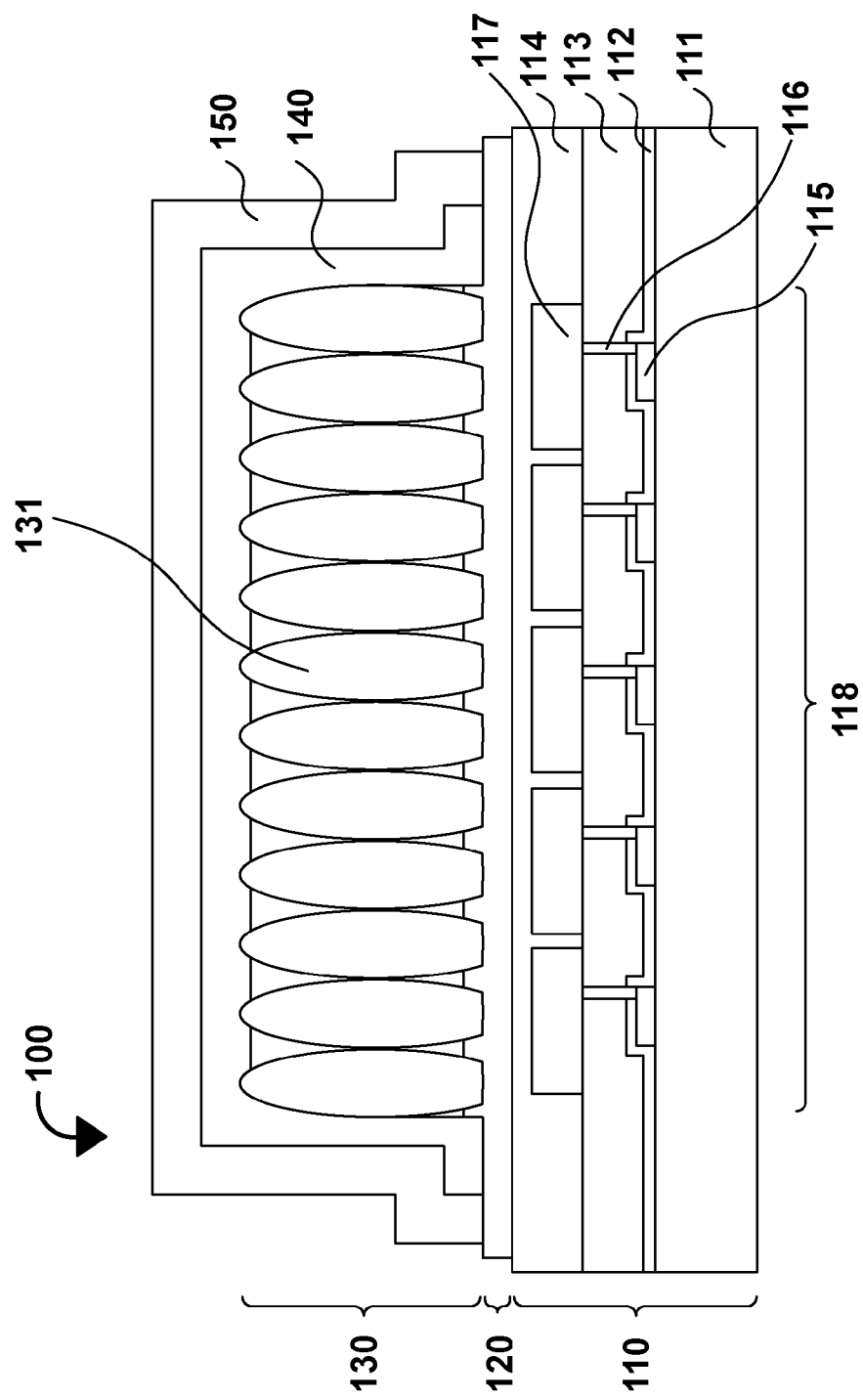

F I G. 3A
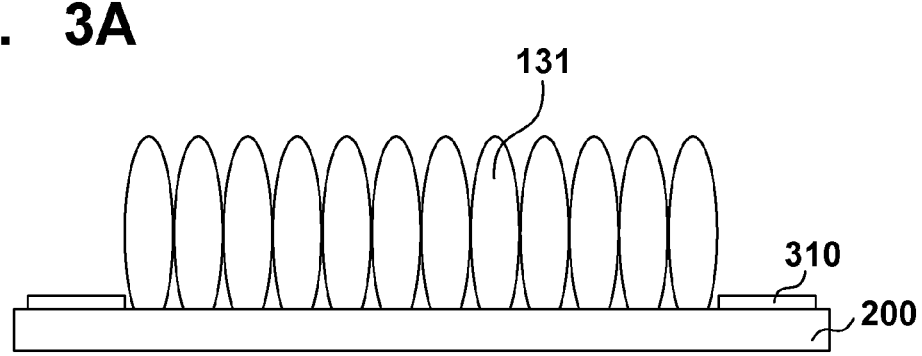
F I G. 3B
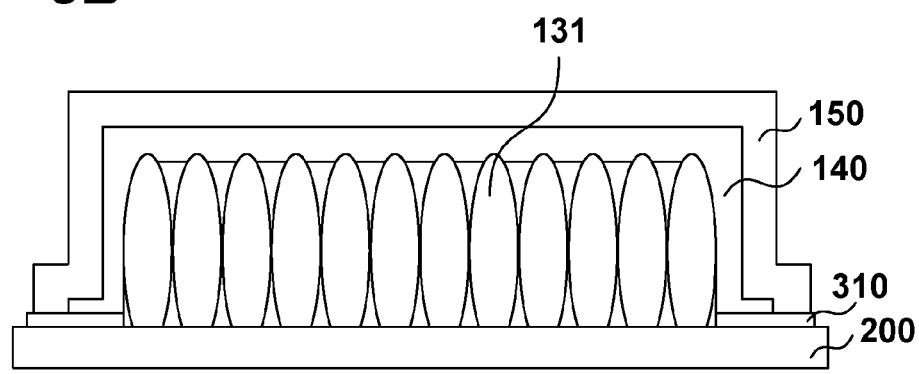
F I G. 3C
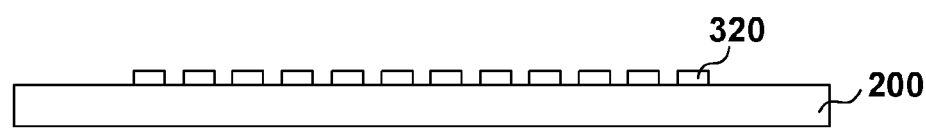
F I G. 3D
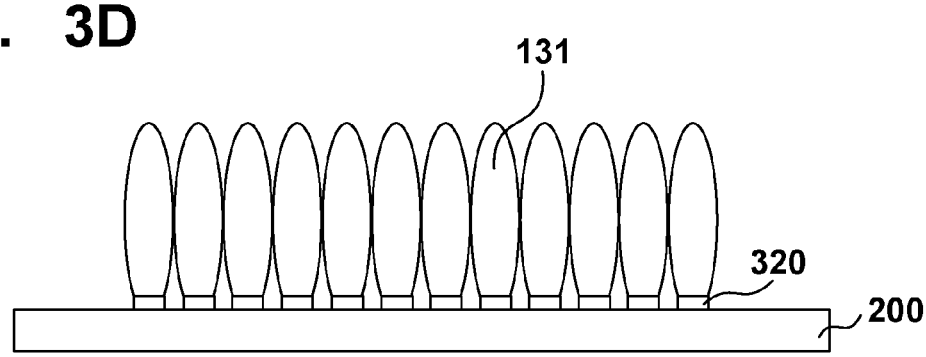

RADIATION DETECTION APPARATUS AND METHOD FOR MANUFACTURING THE SAME

BACKGROUND OF THE INVENTION

1. Field of the Invention

The present invention relates to a radiation detection apparatus and to a method for manufacturing the same.

2. Description of the Related Art

As disclosed in Japanese Patent Laid-Open No. 2006-184187, as conventional methods for manufacturing a radiation detection apparatus, a so-called direct type method and an indirect type method are known. In the direct type method, a scintillator layer is directly formed on a sensor panel having photoelectric conversion elements. In the indirect method, a scintillator layer formed on a base is bonded to a sensor panel. However, in radiation detection apparatuses of the direct type, the adhesion between the sensor panel and the scintillator layer is weak, and it occurred that the scintillator layer separated from the sensor panel. Moreover, in radiation detection apparatuses of the indirect type, after forming a scintillator layer by vapor-depositing a phosphor on a base, the surface of the scintillator layer that is opposite the base is caused to face the sensor panel and bonded thereto. Since the scintillator layer may include splash due to irregular crystal growth, there was the possibility that the splashes destroyed the sensor panel when the scintillator layer and the sensor panel were brought too close together. Therefore, in the radiation detection apparatus of the indirect type, it is not possible to make the distance between the scintillator layer and the sensor panel small, so that the resolution is lower than that of the direct type.

SUMMARY OF THE INVENTION

In order to solve the above-described problem, according to one aspect of the present invention, a technology is provided, with which the adhesion between the scintillator layer and the sensor panel is improved, without lowering the resolution.

A first aspect of the present invention provides a method for manufacturing a radiation detection apparatus, the method comprising: forming a set of columnar crystals capable of converting radiation into visible light on a base; forming a supporting layer that supports the set of columnar crystals; separating the set of columnar crystals supported by the supporting layer from the base; preparing a sensor panel having a photoelectric conversion unit; and adhering a surface of the set of columnar crystals, that surface having been in contact with the base, to the sensor panel using an adhesive material, such that the set of columnar crystals covers the photoelectric conversion unit.

A second aspect of the present invention provides a radiation detection apparatus, comprising: a sensor panel having a photoelectric conversion unit; a set of columnar crystals arranged at a position covering the photoelectric conversion unit; and an adhesion layer adhering the sensor panel to the set of columnar crystals; wherein the adhesion layer enters into the space between the columnar crystals.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram illustrating an exemplary radiation detection apparatus according to an embodiment of the present invention.

FIGS. 3A to 3D are diagrams illustrating modification examples of an embodiment of the present invention.

DESCRIPTION OF THE EMBODIMENTS

Figure 2A:
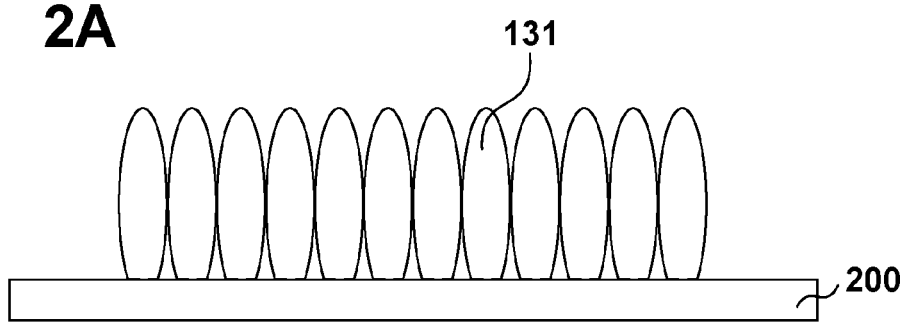
FIGS. 2A to 2D are diagrams illustrating an exemplary method for manufacturing a radiation detection apparatus according to an embodiment of the present invention.

The following is an explanation of embodiments of the present invention, with reference to the accompanying drawings. First, referring to FIG. 1, an exemplary structure of a radiation detection apparatus 100 according to the present embodiment is explained. The radiation detection apparatus 100 may include a sensor panel 110, an adhesion layer 120, a scintillator layer 130, a reflection layer 140, and a protective layer 150. The sensor panel 110 may include an insulating substrate 111, an inorganic insulating layer 112, an organic insulating layer 113, an inorganic insulating layer 114, switching elements 115, electrodes 116 and photoelectric conversion elements 117. The switching elements 115 are arranged on the insulating substrate 111, which may be made of glass, resin or the like, the inorganic insulating layer 112, which may be made of SiN, SiO or the like, is arranged so as to cover the switching elements 115, and the organic insulating layer 113 is arranged on top of that. The photoelectric conversion elements 117, which convert visible light into electric signals, are arranged on the organic insulating layer 113, and the inorganic insulating layer 114, which may be made of SiN, SiO or the like is arranged so as to cover the photoelectric conversion elements 117. The switching elements 115 and the photoelectric conversion elements 117 are connected by electrodes 116 made of tungsten or the like. A photoelectric conversion unit 118 may be constituted by a plurality of the photoelectric conversion elements 117.

The scintillator layer 130 is arranged at a position covering the photoelectric conversion unit 118 of the sensor panel 110, the adhesion layer 120 being arranged between them. The scintillator layer 130 is constituted by a set of columnar crystals 131 of a phosphor, for example. The scintillator layer 130 is capable of converting incident radiation into visible light. The reflection layer 140 is arranged to cover the scintillator layer 130. The reflection layer 140 reflects visible light that has been converted from radiation by the scintillator layer 130 and guides it to the photoelectric conversion unit 118. Furthermore, the protective layer 150 is arranged so as to cover the reflection layer 140. The protective layer 150 increases the moisture resistance of the scintillator layer 130. By manufacturing the radiation detection apparatus 100 according to the present embodiment with the method described below, the adhesion layer 120 enters into the space between the columns of the columnar crystals 131. Thus, it is possible to improve the adhesion between the columnar crystals 131 and the sensor panel 110.

In the following, an example of a method for manufacturing the radiation detection apparatus 100 according to the present embodiment is explained with reference to FIGS. 2A to 2D. As shown in FIG. 2A, first, a set of columnar crystals 131 of a phosphor of CsI or NaI or the like doped with thallium or sodium is formed by vacuum deposition or the like on a base 200. The temperature during the vapor deposition is set to at least 200° C., for example. From the materials on which vapor deposition of the phosphor is possible, a material is selected as the material of the base 200, whose adhesion to the columnar crystals 131 is weak and with which the columnar crystals 131 can be easily separated from the base 200. Examples of such a material are metals, metal foils, resins, Teflon® or the like. As a metal, aluminum, chrome, titanium, titanium nitride, tungsten, molybdenum or an alloy of at least two of these may be used. As a resin, PET, polyimide, parylene, polyurea, vapor-deposited polyimide, a hot-melt resin or the like may be used.

Figure 2B:
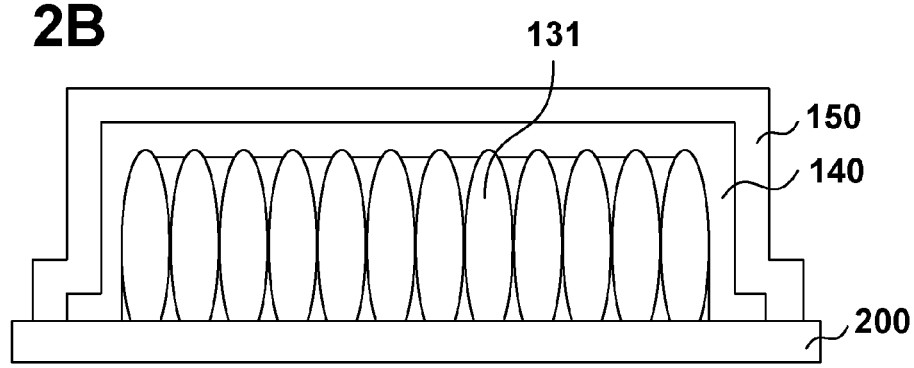

Next, as shown in FIG. 2B, the reflection layer 140 and the protective layer 150 are formed, covering the set of columnar crystals 131. The reflection layer 140 and the protective layer 150 may be formed by vacuum deposition, sputtering or the like, but it is also possible to bond a sheet or the like to the set of columnar crystals 131. Moreover, it is also possible to bond the set of columnar crystals 131 after bonding the reflection layer 140 and the protective layer 150 together. The reflection layer 140 may be formed using aluminum, chrome, titanium, titanium nitride, tungsten, molybdenum or an alloy of at least two of these, for example. The protective layer 150 may be formed using, for example, PET, polyimide, parylene, polyurea, vapor-deposited polyimide, a hot-melt resin, acryl or a layered structure of two or more of these or the like. Moreover, the protective layer 150 may be formed using a layered structure of PET, aluminum and a hot-melt resin or the like.

Figure 2C:
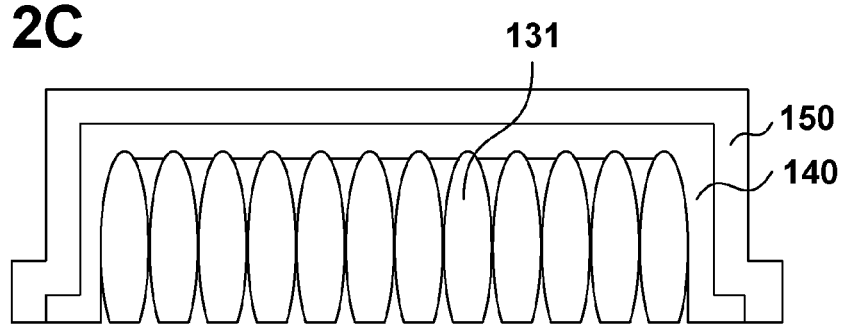
Figure 2D:
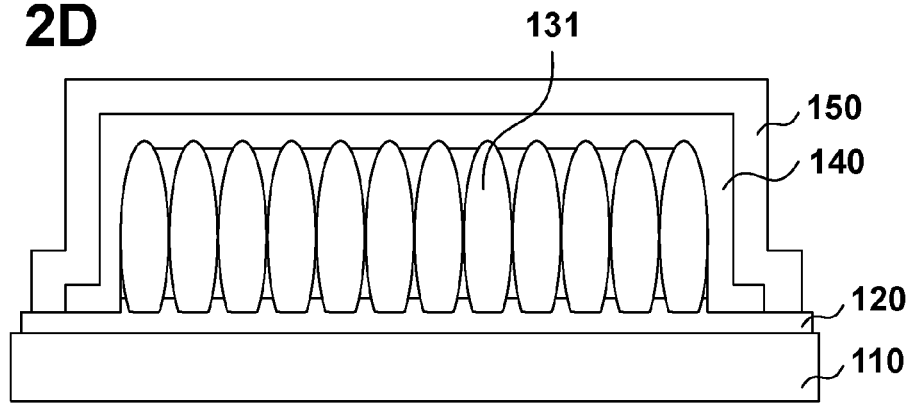

Next, the set of columnar crystals 131 is separated from the base 200, as shown in FIG. 2C. Since the set of columnar crystals 131 is supported by the reflection layer 140 and the protective layer 150, the set of columnar crystals 131 is held without collapsing. That is to say, the reflection layer 140 and the protective layer 150 function as a supporting layer for the set of columnar crystals 131.

Next, the sensor panel 110 including the photoelectric conversion unit 118 is prepared. The sensor panel 110 may be formed using any method and may have any configuration. An example of the configuration of the sensor panel 110 has been explained above using FIG. 1. Next, the set of columnar crystals 131 separated from the base 200 is adhered to the sensor panel 110 using an adhesive material, such that the set of columnar crystals 131 covers the photoelectric conversion unit 118. Furthermore, the surfaces of the columnar crystals 131 that were in contact with the base 200 are oriented to face the sensor panel 110. Since the set of columnar crystals 131 and the sensor panel 110 are bonded together directly, the adhesive material enters into the space between the columns of the columnar crystals 131. Thus, it is possible to increase the adhesion between the scintillator layer 130 and the sensor panel 110. The adhesion layer 120 is formed by curing the adhesive material. As the adhesive material, it is possible to use a resin, such as a hot-melt resin, an epoxy resin, a UV-curing resin, a heat-curing resin, a silicone resin, or the like. Moreover, a liquid adhesive material may be used as the adhesive material. Thus, the adhesive material intrudes more easily between the columns of the columnar crystals 131 and the adhesion is increased more than with a sheet-shaped adhesive material. Moreover, if a hot-melt resin is used as an adhesive material, and the adhesion is performed by applying heat of at least 80° C., then the adhesive material intrudes more easily between the columns of the columnar crystals 131, increasing the adhesion even more. Thus, the radiation detection apparatus 100 is completed.

With the above-described embodiment, the bonding to the sensor panel 110 is performed after forming the columnar crystals 131, so that an adhesive material can be used whose heatproof temperature is lower than the temperature when vapor-depositing the phosphor. Consequently, there is a broader range from which the adhesive material can be selected, and it is possible to manufacture the radiation detection apparatus 100 at lower cost. Moreover, since the adhesive material enters into the space between the columnar crystals 131, the adhesion between the scintillator layer 130 (set of columnar crystals 131) and the sensor panel 110 is increased compared to radiation detection apparatuses of the direct type. Moreover, since the surfaces of the columnar crystals 131 that were in contact with the base 200 (the surfaces where the crystal growth had started) are bonded the sensor panel 110, there is no risk of the sensor panel being destroyed due to splash, as in the case of radiation detection apparatuses of the indirect type. And since the surfaces of the columnar crystals 131 that were in contact with the base 200 are flatter than the surfaces on the opposite side (the surfaces where the crystal growth had ended), the distance between the set of columnar crystals 131 and the sensor panel 110 can be made narrow. Thus, it is possible to reduce the drop in resolution of the radiation detection apparatus 100. Moreover, if a resin that is an organic material is used as the material of the adhesion layer 120, then the adhesion layer 120 can reduce the influence of external electric fields on the photoelectric conversion elements 117. Therefore, there is no need to provide an organic protective layer other than the adhesion layer 120 between the scintillator layer 130 and the sensor panel 110.

MODIFICATION EXAMPLES

The following is an explanation of a plurality of modification examples of the above-described embodiment. These modification examples can be applied in combination to the above-described embodiment.

In the above-described radiation detection apparatus 100, it is possible not to provide the reflection layer 140. In this case, in the step explained with reference FIG. 2B, the protection layer 150 is formed, but no reflection layer 140 is formed. In this case, the protective layer 150 functions as the supporting layer for the set of columnar crystals 131.

Moreover, in the step explained with reference FIG. 2B, it is possible to form a supporting base on the protective layer 150. This supporting base may be made using, for example, a metal, a metal foil, a resin, Teflon or the like, or using aluminum, amorphous carbon or the like. Using such a supporting base, the set of columnar crystals 131 can be separated even more easily in the step explained with reference to FIG. 2C, improving the workability and the yield.

Moreover, as shown in FIG. 3A, after the set of columnar crystals 131 has been formed on the base 200, it is possible to form a buffer film 310 in a region enclosing the region of the base 200 where the set of columnar crystals 131 is formed. The buffer film 310 may be made by adhering a Teflon tape, silicon tape, acryl tape, polyimide tape or the like onto the peripheral region. Moreover, as a buffer film 310, it is also possible to form a Teflon layer, silicone layer, acryl layer or polyimide layer by spraying, printing or the like. As shown in FIG. 3B, the reflection layer 140 and the protective layer 150 are formed so as to cover the set of columnar crystals 131 and the buffer film 310. Moreover, the adhesion of the reflection layer 140 and the protective layer 150 with respect to the buffer film 310 is weaker than the adhesion of the reflection layer 140 and the protective layer 150 with respect to the base 200. Thus, the set of columnar crystals 131 can be more easily separated from the base 200.

Moreover, as shown in FIG. 3C, the base 200 may have convex portions 320 on the surface where the columnar crystals 131 are formed. The convex portions 320 may be formed by forming a metal film by sputtering or CVD or the like, and then spin-coating or slit-coating a resist on it, and exposing and developing the resist through photolithography. As the metal film, aluminum, chrome, titanium, titanium nitride, tungsten, molybdenum, or an alloy of two or more of these may be used. The convex portions 320 may also be formed by any such method as wet etching, dry etching, embossing, printing, electro-discharge machining, laser machining, ultrasonic machining, cutting or the like. As shown in FIG. 3D, the columnar crystals 131 are formed separately on the convex portions 320. Thus, the adhesion material can enter more easily into the space between the columnar crystals 131, improving the adhesion between the scintillator layer 130 and the sensor panel 110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-277424, filed Dec. 13, 2010 which is hereby incorporated by reference herein in its entirety.

What is claimed is:

1. A method for manufacturing a radiation detection apparatus, the method comprising: forming a set of columnar crystals capable of converting radiation into visible light on a base; forming a supporting layer that supports the set of columnar crystals; detaching the set of columnar crystals supported by the supporting layer from the base; preparing a sensor panel having a photoelectric conversion unit; and adhering a surface of the set of columnar crystals, the surface having been in contact with the base, to the sensor panel using an adhesive material, such that the set of columnar crystals covers the photoelectric conversion unit and such that the adhesive material enters into a space between the columnar crystals and a space between the columnar crystals and the supporting layer.

2. The method according to claim 1, further comprising forming a buffer film in a region enclosing a region of the base where the set of columnar crystals has been formed,
wherein in the step of forming the supporting layer, the supporting layer is formed such that it covers the set of columnar crystals and the buffer film, and adhesion of the supporting layer with respect to the buffer film is weaker than adhesion of the supporting layer to the base.

3. The method according to claim 1, wherein the base includes convex portions, and the columnar crystals are grown on these convex portions.

4. The method according to claim 1, wherein the supporting layer includes a protective layer for increasing the moisture resistance of the columnar crystals.

5. The method according to claim 1, wherein the supporting layer includes a reflection layer for reflecting light from the columnar crystals.

6. A radiation detection apparatus, comprising:
a sensor panel having a photoelectric conversion unit; a set of columnar crystals arranged at a position covering the photoelectric conversion unit; a supporting layer covering the set of columnar crystals; and an adhesion layer adhering the sensor panel to the set of columnar crystals and the supporting layer; wherein the adhesion layer enters into a space between the columnar crystals and a space between the columnar crystals and the supporting layer.

* * * * *